United States Patent
Sugesawa et al.

(10) Patent No.: US 7,100,383 B2
(45) Date of Patent: Sep. 5, 2006

(54) AIR CONDITIONER FOR VEHICLE CAPABLE OF RECOVERING VEHICLE DECELERATION ENERGY

(75) Inventors: Naoshi Sugesawa, Kariya (JP); Takeshi Wakisaka, Ichinomiya (JP); Kenji Miura, Toyoake (JP); Tadashi Nakagawa, Nishikamo-gun (JP); Noboru Takagi, Toyota (JP)

(73) Assignee: DENSO Corporation, Kariya (JP)

( * ) Notice: Subject to any disclaimer, the term of this patent is extended or adjusted under 35 U.S.C. 154(b) by 163 days.

(21) Appl. No.: 10/953,702

(22) Filed: Sep. 29, 2004

(65) Prior Publication Data

US 2005/0086953 A1    Apr. 28, 2005

(30) Foreign Application Priority Data

Sep. 30, 2003    (JP)    ............... 2003-340333

(51) Int. Cl.
  B60H 1/32    (2006.01)
  F25B 1/00    (2006.01)
  F25B 49/00   (2006.01)

(52) U.S. Cl. ............... 62/133; 62/227; 62/229; 62/244

(58) Field of Classification Search ............... 62/133, 62/228.1, 228, 4, 227, 229, 236, 244
See application file for complete search history.

(56) References Cited

U.S. PATENT DOCUMENTS 4,425,765 A * 1/1984 Fukushima et al. ............ 62/133

6,330,909 B1 * 12/2001 Takahashi et al. ............ 165/202
6,715,303 B1 *  4/2004 Masuda et al. ............... 62/133
6,820,436 B1 * 11/2004 Tomita et al. ............... 62/228.1

FOREIGN PATENT DOCUMENTS

| JP | 57-44511   | 3/1982  |
|----|------------|---------|
| JP | 8-295131   | 11/1996 |
| JP | 2001-105846 | 4/2001 |

* cited by examiner

*Primary Examiner*—Marc Norman
(74) *Attorney, Agent, or Firm*—Harness, Dickey & Pierce, PLC (57) ABSTRACT

During the period of deceleration of a vehicle, an air conditioning control unit modifies a target cooling temperature (TEO) of an evaporator to a temperature lower than that before the deceleration by γ ° C. in order to store cold in the evaporator (step S130). When the vehicle comes to rest, the air conditioning control unit sets an upwardly-modified target temperature TEOK, which is a temperature modified toward more or less higher temperatures from the target cooling temperature TEO, and brings a compressor to rest and keeps the resting state of the compressor until a detected temperature TE of an evaporator discharge temperature sensor exceeds TEOK (step S180). Therefore, it is possible to effectively utilize the cold heat stored in the evaporator 6 during the period of deceleration of the vehicle with a good feeling of passengers being maintained while the vehicle is at rest.

4 Claims, 5 Drawing Sheets

AIR CONDITIONER FOR VEHICLE CAPABLE OF RECOVERING VEHICLE DECELERATION ENERGY

BACKGROUND OF THE INVENTION

1. Field of the Invention

The present invention relates to an air conditioner for a vehicle that recovers vehicle deceleration energy by storing cold (cooling energy) in a cooling heat exchanger during the period of vehicle deceleration.

2. Description of the Related Art

Conventionally, there is an air conditioner, for a vehicle, in which the temperature of air cooled by an evaporator (a cooling heat exchanger) is detected and a compressor is driven and controlled so that the detected temperature becomes equal to a target cooling temperature, and during the period of vehicle deceleration, the target cooling temperature is reduced to a temperature lower than that before deceleration in order to increase the rate of operation (rate of operation time with respect to total time including rest time) of the compressor and vehicle deceleration energy is recovered by storing cold in the cooling heat exchanger (refer to, for example, Patent document 1 and Patent document 2).

On the other hand, there is another air conditioner for a vehicle, in which a fuel consumption saving effect is achieved by keeping a compressor in a resting state for a predetermined time during the period of vehicle deceleration (refer to, for example, Patent document 3).

[Patent Document 1]
Japanese Unexamined Patent Publication (Kokai) No. 57-44511

[Patent Document 2]
Japanese Unexamined Patent Publication (Kokai) No. 2001-105846

[Patent Document 3]
Japanese Unexamined Patent Publication (Kokai) No. 8-295131

However, in Patent documents 1 and 2 relating to the air conditioner for a vehicle according to a prior art, which air conditioner is described first above, no method is disclosed for improving the fuel consumption saving effect by effectively utilizing the energy recovered during the period of deceleration (the stored cold heat (cooling energy)) while the feelings of passengers are taken into account.

On the other hand, the object of the air conditioner for a vehicle according to a prior art, which air conditioner is described second above, is also to achieve the fuel consumption saving effect and no control that takes into account the feelings of passengers is disclosed in Patent document 3.

The applicants of the present invention have focused on a control to be performed when stored cold heat is utilized because it seems possible to achieve a more marked fuel consumption saving effect by effectively utilizing the stored cold heat, while the feelings of passengers are taken into account, in an air conditioner for a vehicle that recovers vehicle deceleration energy and stores cold in a cooling heat exchanger.

SUMMARY OF THE INVENTION

The present invention has been developed with the above-mentioned problems being taken into account and the object thereof is to provide an air conditioner for a vehicle capable of achieving a more marked fuel consumption saving effect while maintaining better air-conditioning for passengers.

In order to attain the above-mentioned object, in a first aspect according to the present invention, an air conditioner for a vehicle comprising: a cooling heat exchanger (6) for cooling air to be discharged into a vehicle compartment; a temperature detection means (13) for detecting the temperature of the air immediately after being cooled by the cooling heat exchanger (6); a compressor (2) driven by an engine (11) of the vehicle and compressing and discharging a refrigerant having passed through the cooling heat exchanger (6); and a control means (14) for calculating a target cooling temperature (TEO) of the air to be discharged into the vehicle compartment when cooled by the cooling heat exchanger (6) and, at the same time, controlling the operation of the compressor (2) so that a detected temperature (TE) of the temperature detection means (13) becomes equal to the target cooling temperature (TEO); wherein a traveling state judgment means (19) for judging whether the vehicle is in a traveling state is provided. The control means (14): controls the operation of the compressor (2) so that cold (cooling energy) is stored in the cooling heat exchanger (6) when the traveling state judgment means (19) judges that the vehicle is in a decelerated traveling state; and sets an upwardly-modified target temperature (TEOK) higher, by a predetermined value, than the target cooling temperature (TEO) before the vehicle is brought into the decelerated traveling state and, at the same time, controls the operation of the compressor (2) so that the detected temperature (TE) becomes equal to the upwardly-modified target temperature (TEOK) when the traveling state judgment means (19) judges that the vehicle has completed the decelerated traveling state.

According to this aspect, it is possible to effectively utilize the cold heat stored in the cooling heat exchanger during the period of vehicle deceleration after the decelerated traveling state is completed while maintaining good air-conditioning for passengers by setting the upwardly-modified target temperature (TEOK) to a level that does not give passengers an uncomfortable feeling. Therefore, it is possible to achieve a more marked fuel consumption saving effect while maintaining the good air-conditioning for passengers.

In a second aspect according to the present invention, when the traveling state judgment means (19) judges that the vehicle is in a decelerated traveling state, the control means (14) sets a downwardly-modified target temperature (TEOS) lower, by a predetermined value, than the target cooling temperature (TEO) before the vehicle is brought into the decelerated traveling state and, at the same time, stores cold in the cooling heat exchanger (6) by controlling the operation of the compressor (2) so that the detected temperature (TE) of the temperature detection means (13) becomes equal to the downwardly-modified target temperature (TEOS).

According to the second aspect, it is possible to easily store cold in the cooling heat exchanger (6) by only downwardly modifying the target cooling temperature (TEO).

In a third aspect according to the present invention, the control means (14): controls the operation of the compressor (2) so that the detected temperature (TE) of the temperature detection means (13) becomes equal to the upwardly-modified target temperature (TEOK) when the traveling state judgment means (19) judges that the vehicle has completed the decelerated traveling state and is now in a resting state; and removes the setting of the upwardly-modified target temperature (TEOK) and controls the operation of the compressor (2) so that the detected temperature (TE) of the temperature detection means (13) becomes equal to the target cooling temperature (TEO) when the traveling state judgment means (19) judges that the vehicle has been put in motion from the resting state.

According to the third aspect, the operation of the compressor (2) is controlled based on the upwardly-modified target temperature (TEOK) only when the vehicle is at rest. Therefore, it is possible to effectively utilize the cold heat stored during the period of deceleration while the vehicle is at rest during which the engine efficiency is comparatively poor. In addition, it is possible to prevent the control based on the upwardly-modified target temperature (TEOK) from lasting after the vehicle is put in motion and the feelings of passengers from being adversely affected.

In a fourth aspect according to the present invention, when the setting of the upwardly-modified target temperature (TEOK) is removed, the control means (14) prevents the re-setting of the upwardly-modified target temperature (TEOK) regardless of the traveling state of the vehicle until the detected temperature (TE) of the temperature detection means (13) falls below the target cooling temperature (TEO).

According to the fourth aspect, after the control based on the upwardly-modified target temperature (TEOK) has been once performed, the control based on the upwardly-modified target temperature (TEOK) is not performed again until the detected temperature (TE) of the temperature detection means (13) drops below the target cooling temperature (TEO). In other words, the control based on the upwardly-modified target temperature (TEOK) is not performed until a state in which cold can be stored sufficiently in the cooling heat changer (6) is reached. Therefore, it is possible to prevent the feelings of passengers from being adversely affected, which will be caused by the control based on the upwardly-modified target temperature (TEOK) in a state in which cold cannot be stored sufficiently in the cooling heat exchanger (6).

The symbols in the parenthesis attached to each means described above indicate a corresponding with a specific means in embodiments to be described later.

The present invention may be more fully understood from the description of the preferred embodiments of the invention set forth below, together with the accompanying drawings.

DESCRIPTION OF THE PREFERRED EMBODIMENTS

Embodiments of the present invention are explained below with reference to drawings.

Figure 1:
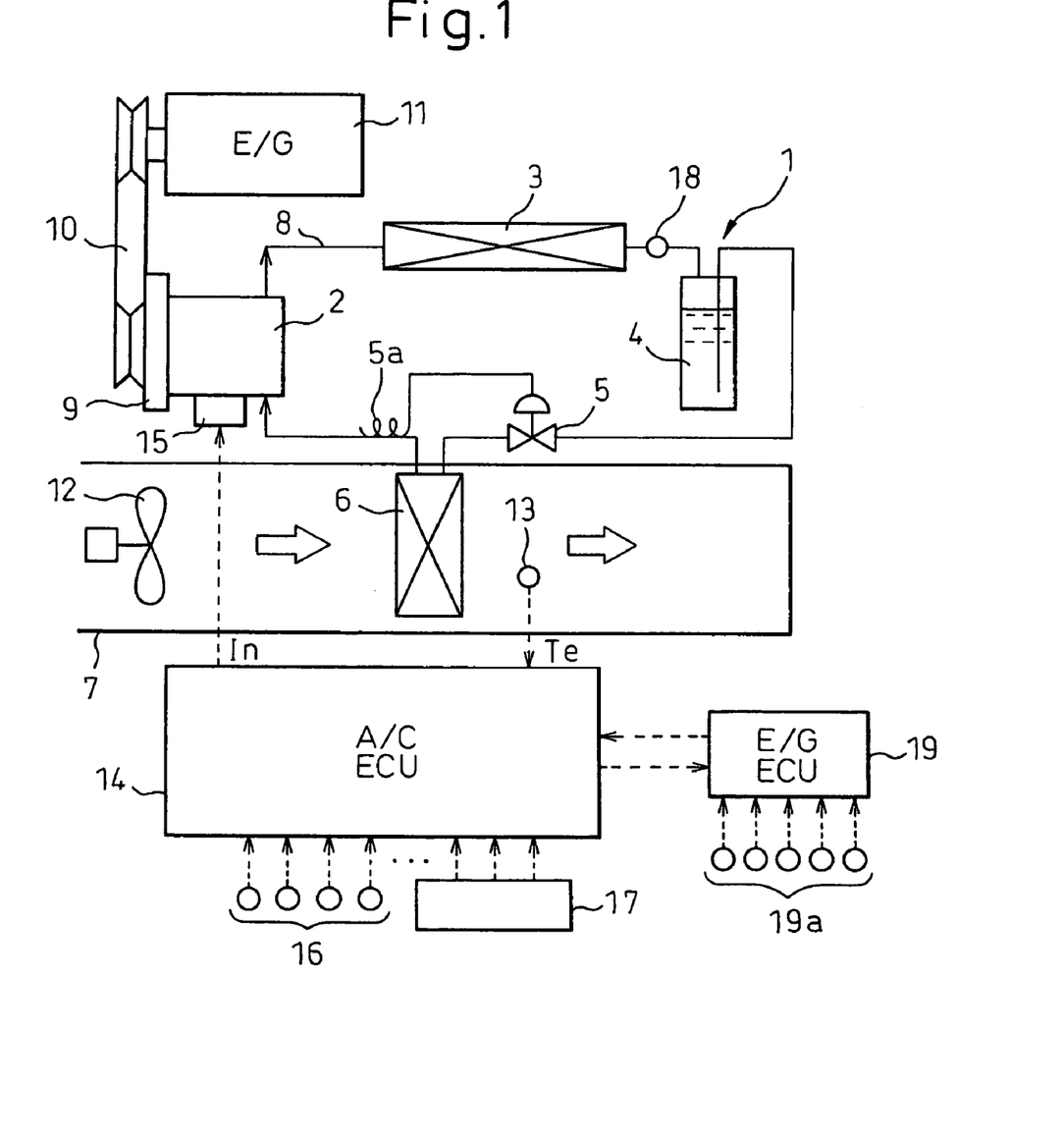
FIG. 1 is a schematic diagram showing an entire general configuration of an air conditioner for a vehicle according to an embodiment of the present invention.

FIG. 1 is a general block diagram of an air conditioner for a vehicle according to an embodiment of the present invention. A refrigerating cycle device 1 for air-conditioning a vehicle is provided with a compressor 2 that sucks in, compresses, and discharges a refrigerant. A superheated gas refrigerant of high temperature and high pressure discharged from the compressor 2 flows into a condenser 3, where heat exchange is effected between the refrigerant and the outside air supplied by a cooling fan (not shown) and the refrigerant is cooled and condensed.

Next, the refrigerant that has condensed in the condenser 3 flows into a receiver (gas-liquid separator) 4, within which the gas and liquid of the refrigerant are separated and excess refrigerant (liquid refrigerant) in the refrigerating cycle device 1 is stored in the receiver 4. The liquid refrigerant from the receiver 4 is reduced in pressure by an expansion valve (a pressure-reducing means) 5 and brought into a gas-liquid two-phase state. The refrigerant of low pressure from the expansion valve 5 flows into an evaporator 6. The evaporator 6 is a cooling heat exchanger installed in an air conditioning case 7 making up an air passage in the air conditioner for a vehicle and the refrigerant of low pressure that has flowed into the evaporator 6 absorbs heat from the air inside the air conditioning case 7 and evaporates.

The expansion valve 5 is a thermo-sensitive expansion valve having a temperature detecting part 5a that detects the temperature of the refrigerant at the outlet of the evaporator 6 and the expansion valve 5 adjusts the opening of the valve (the flow rate of the refrigerant) so as to keep the superheating level of the refrigerator at the outlet of the evaporator 6 at a predetermined value. The cycle components (2 to 6) described above are connected by a refrigerant pipe 8, making up a closed circulation channel.

The compressor 2 is driven by an engine (E/G) 11 for vehicle traveling via a power transmission mechanism 9, a belt 10, etc. The compressor 2 is a variable displacement type compressor, which will be described later. In the present embodiment, the power transmission mechanism 9 is a clutch mechanism (for example, an electromagnetic clutch) that can select transmission or cutoff of power by an electrical control from the outside, but the mechanism 9 may also be a clutch-less mechanism that does not have such a clutch mechanism and that is always in the power transmission mode.

The air conditioning case 7 is provided with a fan 12 and the air inside a vehicle compartment (the inside air) or the air outside a vehicle compartment (the outside air) sucked in from a well-known inside/outside switching box (not shown) is supplied into a vehicle compartment through the air conditioning case 7 by the fan 12. After passing through the evaporator 6, the supplied air passes through a heater unit (not shown) and is discharged into a vehicle compartment through a discharge outlet.

In the air conditioning case 7, an immediately downstream part of the evaporator 6 is provided with an evaporator discharge temperature sensor (a temperature detection means in the present embodiment) 13 comprising a thermistor that detects the temperature of the discharged air immediately after having passed through the evaporator 6.

The heater unit described above is well known and is provided with a hot-water type heater core (a heating means) that heats again the cold air having passed through the evaporator 6, an air mix door that serves as a temperature adjustment means for adjusting the heating level in the hot-water type heater core, a hot-water flow rate control valve, etc. Moreover, at the downstream end of the air flow in the air conditioning case 7, a face discharge outlet from which air is discharged toward the upper body of a passenger in a vehicle compartment, a foot discharge outlet from which air is discharged toward the feet of a passenger in a vehicle compartment, and a defroster discharge outlet from which air is discharged toward the inner surface of the windshield in a vehicle compartment are formed and a discharge mode door for switching between the opening and closing of these discharge outlets is provided.

The compressor 2 described above is an external variable displacement type compressor having an electromagnetic displacement control valve (a discharge displacement control mechanism) 15 controlled by an electrical signal from an air conditioning control unit (A/CECU, a control means in the present embodiment) 14 and changing the discharge displacement by changing the control pressure using the control valve 15. Detected signals of a sensor group 16 for automatically controlling air conditioning and operation signals of an operation switch group of an air conditioning operation panel 17 are inputted to the air conditioning control unit 14.

To be specific, the sensor group 16 includes an inside air sensor (an inside air temperature detection means), an outside air sensor, a solar radiation sensor, a humidity sensor (a humidity detection means), an engine water temperature sensor, etc., and the operation switch group of the air conditioning operation panel 17 includes a temperature setting switch, an air flow rate switching switch, a discharge mode switching switch, an inside/outside air switching switch, an air conditioner switch that issues a command to operate the compressor 2, etc.

Moreover, in the refrigerating cycle device 1, a high-pressure sensor 18 for detecting a high pressure (a compressor discharge pressure) is provided in the circulation channel of high pressure from the discharge side of the compressor 2 to the inlet of the expansion valve 5 and the detected signal of the high-pressure sensor 18 is also inputted to the air conditioning control unit 14. In the example shown in the figure, the high-pressure sensor 18 is provided on the refrigerant pipe at the outlet side of the condenser 3.

Still moreover, the air conditioning control unit 14 is connected to an engine control unit (E/GECU) 19 installed in the vehicle control space and signals can be transmitted between both the control units 14 and 19. As is known widely, the engine control unit 19 totally controls parameters such as the flow rate of fuel to be injected to and the ignition timing of the vehicle engine 11 based on the signals from a sensor group 19a for detecting the state of operation of the vehicle engine 11, etc.

In the present embodiment, the engine control unit 19 transmits information about the engine speed, the vehicle speed, the throttle opening, the accelerator opening etc. to the air conditioning control unit 14 and the information is used when a judgment is made whether a vehicle is in a decelerated traveling state, a resting state, or a re-starting state, etc., which will be described later. The engine control unit 19 is a traveling state judgment means in the present embodiment.

Figure 2:
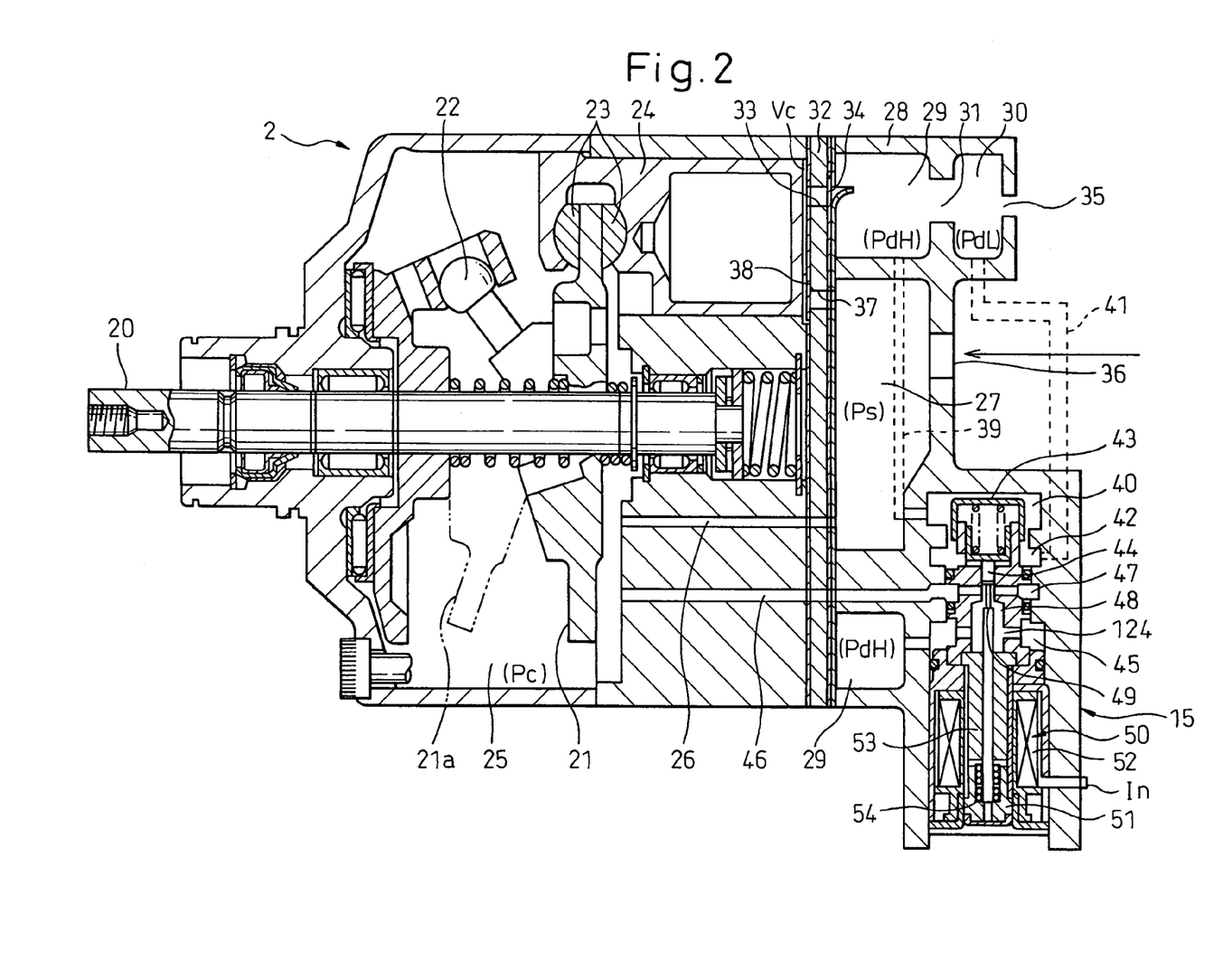
FIG. 2 is a sectional view showing a configuration of a compressor according to an embodiment of the present invention.

FIG. 2 is a sectional view of the external variable capacity compressor 2 used in the present embodiment. In the compressor 2, a target flow rate Gro of the compressor discharge flow rate is specified by a control current (that is, a control current signal) In of the electromagnetic displacement control valve 15 and the discharge displacement is increased or decreased so that the compressor discharge flow rate is kept at the target flow rate Gro (a discharge displacement control type). To be specific, the target flow rate Gro increases in proportion to the increase of the control current In.

As shown in FIG. 2, the compressor 2 is a single-headed swash plate type variable displacement compressor and the variable displacement mechanism itself is well known. The power of the vehicle engine 11 is transmitted to a rotating shaft 20 via the power transmission mechanism 9, etc., shown in FIG. 1. The left end of the rotating shaft 20 in FIG. 2 is a connection part with the power transmission mechanism 9. A swash plate 21 is connected to the rotating shaft 20 both integrally and rotatably and, at the same time, the angle of inclination of the swash plate 21 can be adjusted by a spherical hinge mechanism 22. The position of the swash plate 21 indicated by the solid line corresponds to a state in which the angle of inclination with respect to the rotation shaft 20 is small (a small displacement state) and a position 21a indicated by the alternate long and two short dashes line corresponds to a state in which the angle of inclination with respect to the rotating shaft 20 is large (a large displacement state).

A plurality of pistons 24 (for example, five pistons) are connected to the swash plate 21 via shoes 23. In this configuration, the plurality of the pistons 24 are made to reciprocate sequentially via the shoes 23 by rotating the swash plate 21 together with the rotating shaft 20 so that the volume of a cylinder chamber (an operation chamber) Vc is increased and decreased in order to suck in and compress a refrigerant.

In order to change the discharge displacement of the compressor 2, the stroke of the piston 24 is changed by changing the angle of inclination of the swash plate 21, which is achieved by changing a pressure Pc in a crank chamber (a swash plate chamber) 25 in which the swash plate 21 is accommodated. In other words, an increase in the angle of inclination of the swash plate 21 causes the piston stroke to increase and as a result, the discharge displacement is increased, and a decrease in the angle of inclination of the swash plate 21 causes the piston stroke to decrease and as a result, the discharge displacement is decreased.

This means that the crank chamber 25 plays also a role as a control pressure chamber for changing the discharge displacement of the compressor 2. The crank chamber (the swash plate chamber) 25 is communicated with a suction chamber 27 of the compressor 2 through a throttle passage 26.

On the other hand, a first discharge chamber 29 and a second discharge chamber 30 are formed in a rear housing 28 of the compressor 20 and the first discharge chamber 29 is communicated with the second discharge chamber 30 through a throttle communication passage (a throttle part) 31 having a predetermined throttle hole diameter. The refrigerant discharged from the operation chamber (the cylinder chamber) Vc of each piston 24 flows into and collects in the first discharge chamber 29 via a discharge port 33 and a discharge valve 34 of a valve plate 32, and thus the discharge pulsation is smoothed. The second discharge chamber 30 is connected to an external refrigerant discharge pipe via a discharge outlet 35.

Moreover, the rear housing 28 is provided with: a suction inlet 36, through which the low-pressure gas refrigerant from the outlet of the evaporator 6 is sucked in, and the suction chamber 27 into which the refrigerant flows through the suction inlet 36. The refrigerant from the suction chamber 27 is sucked into the operation chamber Vc via a suction port 37 and a suction valve 38 of the valve plate 32.

A pressure loss is produced when the refrigerant from the first discharge chamber 29 passes through the throttle communication passage 31 and flows toward the second discharge chamber 30 and, therefore, a pressure $Pd_L$ in the second discharge chamber 30 becomes lower than a pressure $Pd_H$ in the first discharge chamber 29 by a predetermined pressure difference ΔP. The pressure difference ΔP between the two portions before and after the throttle communication passage 31 is proportional to the flow rate of the compressor discharge refrigerant.

The electromagnetic displacement control valve 15 makes up a discharge capacity control mechanism for controlling a pressure Pc in the crank chamber 25, which plays also a role as a pressure control chamber, and the electromagnetic displacement control valve 15 is arranged at the side near the rear housing 28 of the compressor 2. Next, a specific example of a configuration of the displacement control valve 15 is explained. The control valve 15 is provided with: a first control chamber 40 to which the pressure $Pd_H$ in the first discharge chamber 29 is guided through a communication passage 39; and a second control chamber 42 to which the pressure $Pd_L$ in the second discharge chamber 30 is guided through a communication passage 41. The control chambers 40 and 42 are separated by a cylindrical member 43 that is slidable therewith. In this configuration, a force due to the pressure difference ΔP between the two control chambers 40 and 42 is applied to one end of a push rod 44 via the cylindrical member 43, etc., which serves as a force in the valve-opening direction.

Moreover, the control valve 15 is provided also with a discharge pressure chamber 45 to which the pressure $Pd_H$ in the first discharge chamber 29 is introduced and a control pressure chamber 47 that is communicated with the crank chamber 25 through a communication passage 46, and the discharge pressure chamber 45 and the control pressure chamber 47 are communicated with each other through a throttle-passage 48, the sectional area of the opening of the throttle passage 48 is adjusted by a valve body 49 of the push rod 44, and thus the pressure in the control pressure chamber 47, that is, the pressure (the control pressure) Pc in the crank chamber 25 can be adjusted.

On the other hand, an electromagnetic mechanism part 50 of the control valve 15 applies a force in opposition to a valve-opening force due to the pressure difference ΔP, that is, a valve-closing-force, to the valve body 49 (the push rod 44). The valve body 49 is integrally connected to a plunger (a movable iron core) 51 of the electromagnetic mechanism part 50 and an electromagnetic suction force induced by an exciting coil 52 is applied to the plunger 51. In other words, the plunger 51 is arranged in opposition to a fixed magnetic pole member (a fixed iron core) 53 at a predetermined distance and the plunger 51 is displaced in the axial direction (upward direction in FIG. 2) toward the fixed magnetic pole member 53 by the electromagnetic suction force induced by the exciting coil 52. Due to the displacement of the plunger 51 in the axial direction, the valve body 49 is moved in the valve-opening direction.

Moreover, a coil spring 54 is arranged between the plunger 51 and the fixed magnetic pole member 53 as an elastic means for producing an elastic force in opposition to an electromagnetic force.

In the present embodiment, it is possible to apply a desired electromagnetic suction force (that is, a force in the direction of closing the valve body 49) to the plunger 51 by controlling the control current (the control current signal) In to be passed through the exciting coil 52 (for example, by controlling the break-make ratio, that is, the duty ratio Dt of the control current In). The control current In that passes through the exciting coil 52 is controlled by the air conditioning control unit 14 described above.

As the electromagnetic displacement control valve 15 is configured as above, if the force of closing the valve body 49 is increased by controlling the control current In, the valve body 49 is displaced upward in FIG. 2 and the sectional area of opening of the throttle passage 48 is decreased and, therefore, the pressure in the control pressure chamber 47, that is, the pressure Pc in the crank chamber 25, is reduced, the angle of inclination of the swash plate 21 is increased as shown by the alternate long and two short dashes line 21a in FIG. 2 and as a result, the discharge displacement is increased.

Conversely, if the force of closing the valve body 49 is decreased by controlling the control current In, the valve body 49 is displaced downward in FIG. 2 by the force of the coil spring 54 and the sectional area of opening of the throttle passage 48 is increased and, therefore, the pressure in the control pressure chamber 47, that is, the pressure Pc in the crank chamber 25, is increased, the angle of inclination of the swash plate 21 is decreased as shown by the position indicated by the solid line in FIG. 2 and as a result, the discharge displacement is decreased.

On the other hand, when the speed of the engine 11 is increased and that of the compressor 2 is also increased, the flow rate of the discharge refrigerant discharged from the compressor 2 is increased in conjunction with this, but if the flow rate of the discharge refrigerant is increased, the pressure difference ΔP between the first and second control chambers 40 and 42 becomes greater and, therefore, the valve-opening force becomes greater, the push rod 44 and the valve body 49 are moved downward in FIG. 2, the sectional area of opening of the throttle passage 48 is increased and as a result, the discharge displacement of the compressor 2 is decreased.

Conversely, when the speed of the engine 11 is decreased and that of the compressor 2 is also decreased, the flow rate of the discharge refrigerant discharged from the compressor 2 is decreased in conjunction with this, but if the flow rate of the discharge refrigerant is decreased, the pressure difference ΔP between the first and second control chambers 40 and 42 becomes smaller and, therefore, the valve-opening force becomes smaller, the push rod 44 and the valve body 49 are moved upward in FIG. 2, the sectional area of opening of the throttle passage 48 is decreased and as a result, the discharge displacement of the compressor 2 is increased.

At this time, the push rod 44 and the valve body 49 are moved to a position where the valve-closing force and the valve-opening force reach a state of equilibrium, and this means that the discharge displacement of the compressor 2 mechanically changes until the pressure difference ΔP between the first and second control chambers 40 and 42 reaches a predetermined pressure difference determined unequivocally by the valve-closing force (the electromagnetic suction force), that is, a target pressure difference ΔPo.

Therefore, as described above, it is possible to change the flow rate of the discharge refrigerant actually discharged from the compressor 2 by changing the target pressure difference ΔPo, which is determined unequivocally by the valve-closing force (the electromagnetic suction force) by the control of the control current In, and by thus changing the discharge displacement thereof.

Next, the operation control of the compressor in the air conditioner for a vehicle in the present embodiment is explained below based on the configuration described above.

Figure 3:
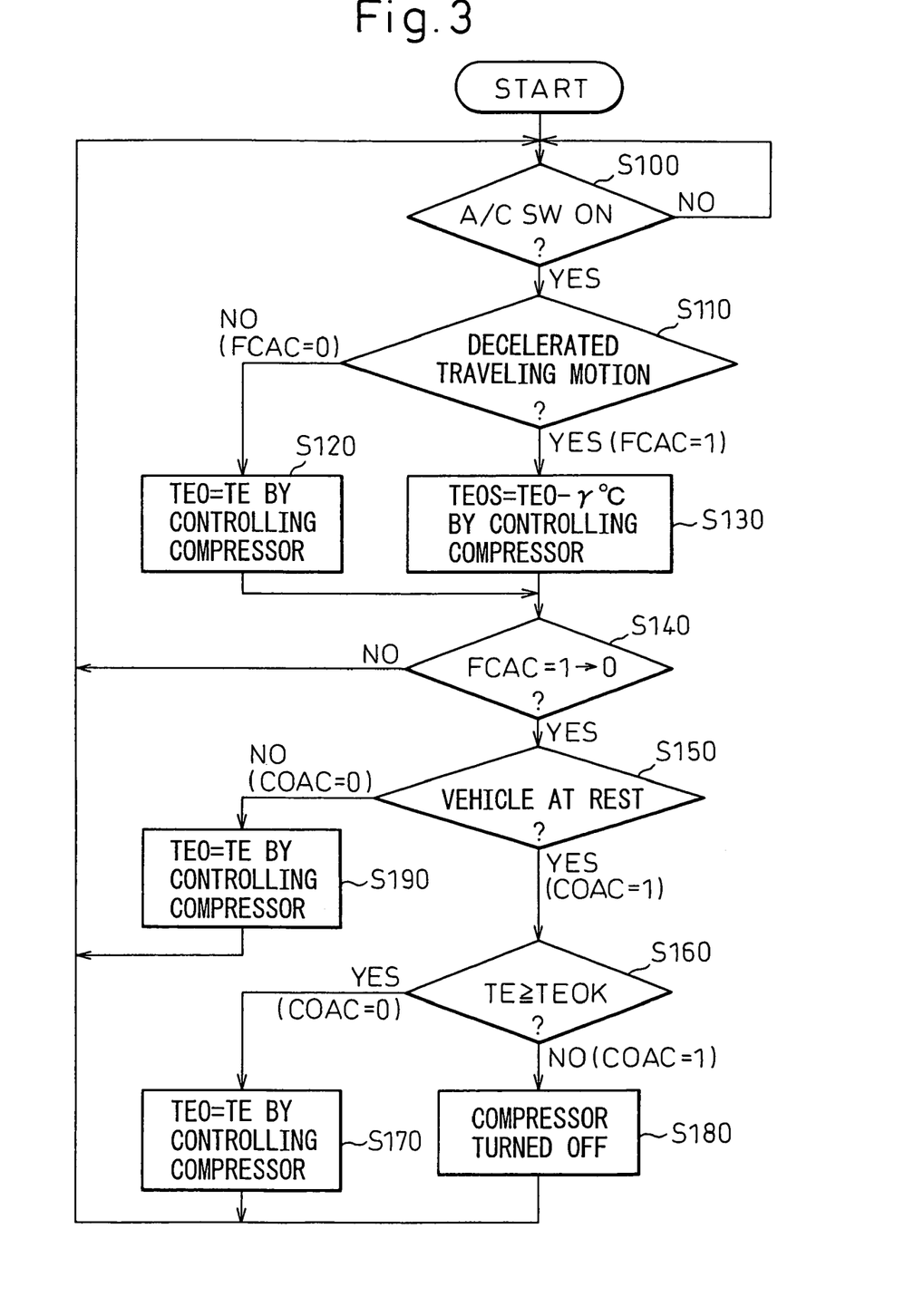
FIG. 3 is a flow chart showing a compressor control process by an air conditioning control unit 14 according to an embodiment of the present invention.

FIG. 3 is a flow chart showing the basic control process of the compressor by the air conditioning control unit 14.

First, the air conditioning control unit 14 judges whether the air conditioner switch of the air conditioning operation panel 17 is turned on (step S100) and monitors, when it is not turned on, the air conditioner switch until it is turned on. When the result of the judgment in step S100 is that the air conditioning switch is turned on, whether the vehicle is in a decelerated traveling state is judged (step S110). To be specific, information about those such as the vehicle speed, the engine speed, and the accelerator opening is inputted from the sensor group 19a via the engine control unit 19 and the judgment whether the vehicle is in the decelerated traveling state is made. In the present embodiment, the vehicle is judged to be in a decelerated traveling state when the vehicle speed is greater than or equal to $\alpha$ km/h, the engine speed Ne is greater than or equal to $\beta$ rpm, and the accelerator opening is less than or equal to 0 deg.

When the result of judgment in step S110 is "NO", an FCAC flag is set to "0" and a normal control of the compressor is performed (step S120). In step S120, the control current In to be output to the electromagnetic displacement control valve 15 of the compressor 2 is controlled so that the detected temperature TE of the evaporator discharge temperature sensor 13 becomes equal to the target cooling temperature TEO calculated based on the temperature of the outside air, etc.

When the result of judgment in step S110 is "YES ", in other words, when the vehicle is judged to be in a decelerated traveling state, the FCAC flag is set to "1" and TEO is modified to a lower temperature by $\gamma$ ° C. and the target cooling temperature (the downwardly-modified target temperature) TEOS is set in order to perform the control of cold (cooling energy) storage. Then the control current In to be output to the electromagnetic displacement control valve 15 of the compressor 2 is controlled so that the detected temperature TE of the evaporator discharge temperature sensor 13 becomes equal to the target cooling temperature TEOS modified toward lower temperatures (step S130).

After either of steps S120 and S130 is performed, whether the FCAC flag has changed from "1" to "0" or whether a state in which the FCAC flag is "0" continues after the FCAC flag has changed from "1" to "0" is judged (step 140). When the result of judgment made in step S140 is "NO", in other words, when the vehicle is judged to be in a decelerated traveling state, the process returns to step S100.

When the result of judgment made in step S140 is "YES", whether the vehicle is at rest is judged (step S150). Specifically, information about the vehicle speed, the engine speed, the accelerator opening, etc. is inputted from the sensor group 19a via the engine control unit 19 and whether the vehicle is at rest is judged. In the present embodiment, the vehicle is judged to be at rest when the vehicle speed is less than $\alpha$ km/h or the engine speed Ne is less than $\beta$ rpm, and the accelerator opening is less than or equal to 0 deg.

When the vehicle is judged to be at rest in step S150, a COAC flag is set to "1" and the target cooling temperature TEO is modified to a higher temperature by predetermined temperatures and the target cooling temperature (the upwardly-modified target temperature) TEOK is set. Then whether the detected temperature TE of the evaporator discharge temperature sensor 13 is higher than or equal to the target cooling temperature TEOK modified toward higher temperatures is judged (step S160).

Figure 4:
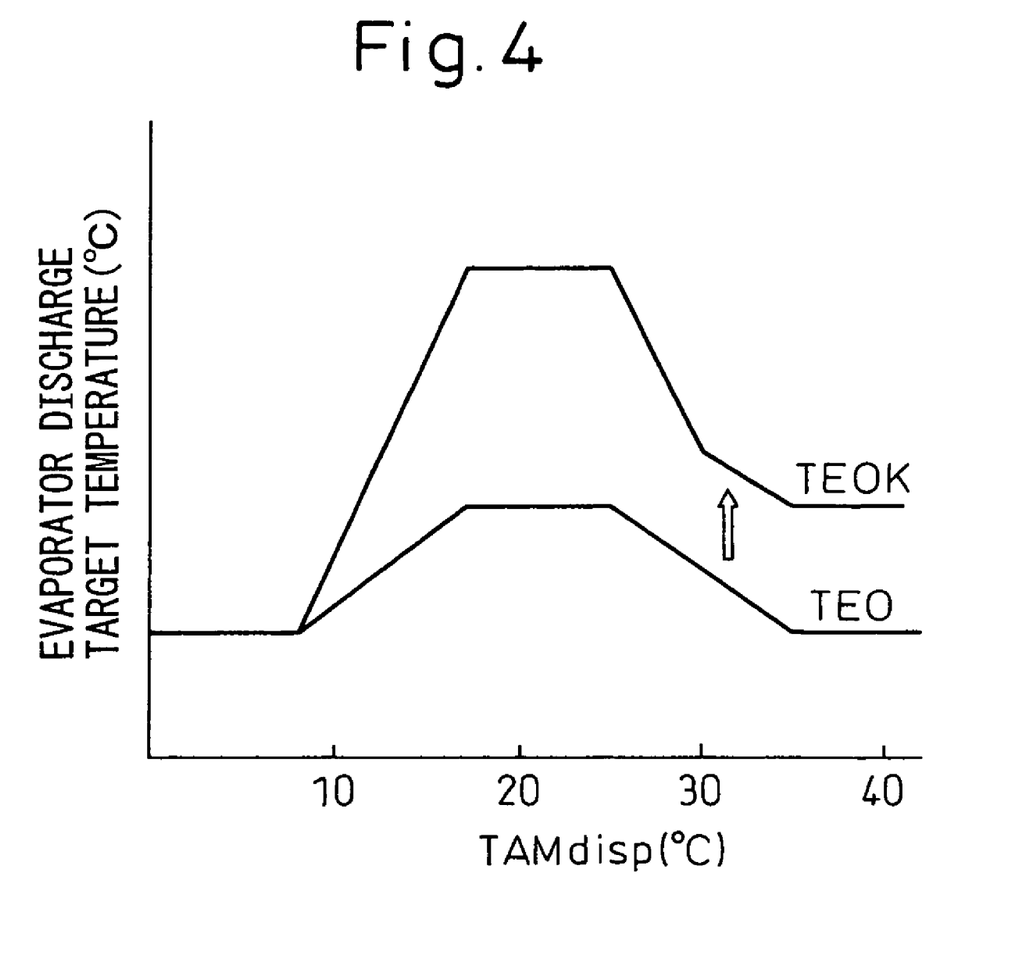
FIG. 4 is a characteristic diagram of a target cooling temperature TEOK modified toward higher temperatures.

The target cooling temperature (the evaporator discharge target temperature) TEOK set here is the upwardly-modified TEO, which is in accordance with the outside air temperature correction value, and the extent of modification is so small that passengers do not notice the change in the temperature of conditioned air discharged into a vehicle compartment (passengers are unlikely to feel uncomfortable), as shown in FIG. 4. In the present embodiment, when the outside air temperature correction value TAMdisp is in the range between 30 and 35° C., the temperature is modified to a higher temperature by about 6° C.

When the result of judgment made in step S160 is that the detected temperature TE of the evaporator discharge temperature sensor 13 is higher than or equal to the upwardly-modified target cooling temperature TEOK, the COAC flag is set to "0" and the control current In to be output to the electromagnetic displacement control valve 15 of the compressor 2 is controlled so that the detected temperature TE of the evaporator discharge temperature sensor 13 becomes equal to the target cooling temperature TEO (step S170).

When the result of judgment made in step S160 is that the detected temperature TE is lower than the target cooling temperature TEOK, the COAC flag is set to "1" and the compressor 2 is brought to rest (the displacement is reduced to zero) (step S180). When either of steps S170 and S180 is performed, the process returns to step S100.

On the other hand, when the result of judgment made in step S150 is that the vehicle is not at rest, in other words, the vehicle is judged to be put in motion, the COAC flag is set to "0" and the control current In to be output to the electromagnetic displacement control valve 15 of the compressor 2 is controlled so that the detected temperature TE of the evaporator discharge temperature sensor 13 becomes equal to the target cooling temperature TEO (step S190), and the process returns to S100.

According to the configuration and operations described above, while the vehicle is in a decelerated traveling state, the air conditioning control unit 14 sets the downwardly-modified target temperature TEOS, which is lower than the target cooling temperature TEO by $\gamma$ ° C., and, at the same time, drives and controls the compressor 2 so that the detected temperature TE of the evaporator discharge air temperature sensor 13 becomes equal to the downwardly-modified target cooling temperature TEOS. Due to this, cold is stored in the evaporator 6.

By the storage of cold into the evaporator 6, the drive power of the compressor 2 after the vehicle has completed the deceleration can be reduced and a fuel consumption saving effect can be achieved.

Moreover, when the vehicle has completed deceleration and is now at rest, and the cold heat stored during the period of deceleration is utilized, the target cooling temperature TEOK, which is set to a temperature more or less higher than the target cooling temperature TEO during the period of normal traveling motion, is employed as a value for judgment and the compression and discharge of a refrigerant are performed by the compressor 2 only when the detected temperature TE exceeds the target cooling temperature TEOK so that the air-conditioning feelings of passengers are not affected adversely.

Due to the control described above, it is possible to achieve a more marked fuel consumption saving effect while maintaining the better feelings of passengers.

The control to bring the compressor 2 to rest (to stop refrigerant discharge) is performed only while the vehicle is at rest. This is because the engine efficiency is relatively poor while the vehicle is at rest and a fuel consumption saving effect can be improved by keeping the compressor 2 in a resting state as long as possible while the vehicle is at rest, and it is possible to ensure a cooling performance by driving the compressor 2 while the engine efficiency is relatively good, that is, while the vehicle is in a traveling motion.

Figure 5:
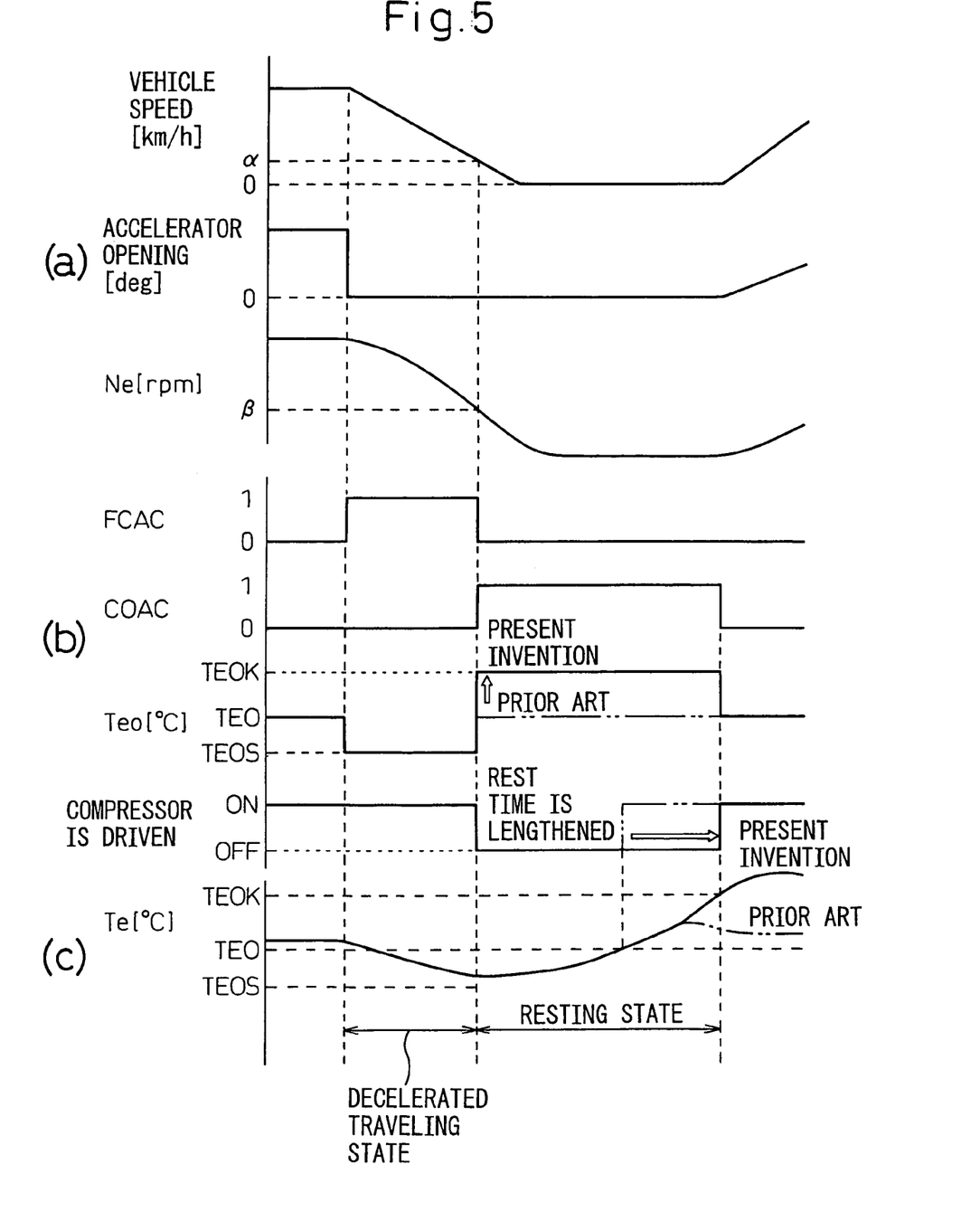
FIG. 5 is a time chart showing an operation example of an air conditioner for a vehicle according to an embodiment of the present invention.

FIG. 5 is a time chart showing an operation example of the air conditioner for a vehicle in the present embodiment. When judging that a vehicle has changed from a constant speed traveling state into a decelerated traveling state, based on information about the vehicle speed, the accelerator opening, and the engine speed as shown in FIG. 5(*a*), the air conditioning control unit 14 in the present embodiment sets the FCAC flag to "1" and sets the target cooling temperature to TEO-γ (TEOS) by lowering the target cooling temperature TEO by γ ° C., as shown in FIG. 5(*b*). At this time, the compressor 2 is driven so that the detected temperature TE of the evaporator discharge temperature sensor 13 becomes equal to TEOS and cold is stored in the evaporator 6 as shown in FIG. 5(*c*).

Next, when judging that the vehicle has changed from a decelerated traveling state into a resting state based on information about those such as the vehicle speed, the accelerator opening, and the engine speed, the air conditioning control unit 14 sets the FCAC flag to "0", as shown in FIG. 5(*b*) and the COAC flag to "1", and sets the target cooling temperature to TEOK by modifying the target cooling temperature TEO toward higher temperatures as shown in FIG. 4. At this time, the compressor 2 is brought to rest and air conditioning is performed by utilizing the cold heat stored in the evaporator 6. Although not shown in this operation example, when the detected temperature TE of the evaporator discharge temperature sensor 13 exceeds TEOK while the vehicle is at rest, the compressor 2 is driven so that the detected temperature TE becomes equal to TEO.

Generally in a prior art, when a decelerated traveling state is detected, cold is stored in the evaporator 6 but the target cooling temperature is set to TEO while a vehicle is at rest (refer to the alternate-long-and-two-short dashed line in FIG. 5(*b*)). Therefore, when the detected temperature TE of the evaporator discharge temperature sensor 13 becomes higher than or equal to TEO, the compressor is driven and as a result, the period during which the compressor is at rest is relatively short.

According to the present embodiment, it is possible to lengthen the period during which the compressor 2 is at rest while a vehicle is at rest without adversely affecting the feeling of the passengers (refer to FIG. 5(*b*)) and a more marked fuel consumption saving effect can be achieved.

OTHER EMBODIMENTS

In the embodiment described above, each time a vehicle comes to rest after deceleration, the target cooling temperature TEOK, which has been modified toward higher temperatures so that the evaporator 6 can effectively utilize cold air, is set but it may also be possible, after the control based on the target cooling temperature TEOK has been once performed, to prevent the setting of the upwardly-modified target cooling temperature TEOK from being made again and not to perform the control based on the target cooling temperature TEOK until the detected temperature TE of the evaporator discharge temperature sensor 13 falls below the target cooling temperature TEO.

In other words, it may be possible not to perform the control based on the upwardly-modified target temperature TEOK until a state, in which the temperature of the evaporator 6 falls to TEO and cold can be stored sufficiently, is reached. According to this embodiment, it is possible to prevent the feelings of passengers from being adversely affected, which will be caused by performing the control based on the target cooling temperature TEOK in a state in which cold cannot be stored sufficiently in the evaporator 6 (for example, when a vehicle is put in motion again but is decelerated and brought to rest in a short period of time and, therefore, the temperature of the evaporator 6 is relatively high).

Moreover, in the embodiment described above, whether a vehicle is in a decelerated traveling state or whether a vehicle is at rest is judged based on the vehicle speed, the engine speed, and the accelerator opening, but the information on which the judgment is based is not limited to these pieces of information. Any information can be acceptable provided that whether a vehicle is in a decelerated traveling state or whether a vehicle is at rest can be judged. For example, a judgment may be made based on any one of the vehicle speed, the engine speed, and the accelerator opening, or based on the state of the current being supplied to a brake lamp (the state of the stop operation signal).

Still moreover, in the embodiment described above, the compressor 2 is a compressor of variable displacement type, but not limited to this type. The present invention can also be effectively applied to a compressor of fixed displacement type.

While the invention has been described by reference to specific embodiments chosen for the purposes of illustration, it should be apparent that numerous modifications could be made thereto by those skilled in the art without departing from the basic concept and scope of the invention.

The invention claimed is:

1. An air conditioner for a vehicle comprising:
    a cooling heat exchanger for cooling air to be discharged into a vehicle compartment;
    a temperature detection means for detecting the temperature of the air immediately after being cooled by the cooling heat exchanger;
    a compressor driven by an engine of the vehicle and compressing and discharging a refrigerant having passed through the cooling heat exchanger; and
    a control means for calculating a target cooling temperature (TEO) of the air to be discharged into the vehicle compartment when cooled by the cooling heat exchanger and, at the same time, controlling the operation of the compressor so that a detected temperature (TE) of the temperature detection means becomes equal to the target cooling temperature (TEO),
    wherein a traveling state judgment means for judging a traveling state of the vehicle is provided, and
    wherein the control means:
    controls the operation of the compressor so that cold is stored in the cooling heat exchanger when the traveling state judgment means judges that the vehicle is in a decelerated traveling state; and
    sets an upwardly-modified target temperature (TEOK) higher, by a predetermined value, than the target cooling temperature (TEO) before the vehicle is brought into the decelerated traveling state and, at the same time, controls the operation of the compressor so that the detected temperature (TE) becomes equal to the upwardly-modified target temperature (TEOK) when the traveling state judgment means judges that the vehicle has completed the decelerated traveling state.

2. The air conditioner for a vehicle as set forth in claim 1, wherein when the traveling state judgment means judges that the vehicle is in a decelerated traveling state, the control means sets a downwardly-modified target temperature (TEOS) lower, by a predetermined value, than the target cooling temperature (TEO) before the vehicle is brought into the decelerated traveling state and, at the same time, stores cold in the cooling heat exchanger by controlling the operation of the compressor so that the detected temperature (TE) of the temperature detection means becomes equal to the downwardly-modified target temperature (TEOS).

3. The air conditioner for a vehicle as set forth in claim 1, wherein the control means:
   controls the operation of the compressor so that the detected temperature (TE) becomes equal to the upwardly-modified target temperature (TEOK) when the traveling state judgment means judges that the vehicle has completed the decelerated traveling state and is now in a resting state; and removes the setting of the upwardly-modified target temperature (TEOK) and controls the operation of the compressor so that the detected temperature (TE) becomes equal to the target cooling temperature (TEO) when the traveling state judgment means judges that the vehicle has been put in motion from the resting state.

4. The air conditioner for a vehicle as set forth in claim 1, wherein when the setting of the upwardly-modified target temperature (TEOK) is removed, the control means prevents the setting of the upwardly-modified target temperature (TEOK) from being made again regardless of the traveling state of the vehicle until the detected temperature (TE) falls below the target cooling temperature (TEO).

* * * * *